United States Patent
Song et al.

(10) Patent No.: US 9,575,502 B2
(45) Date of Patent: Feb. 21, 2017

(54) BI-DIRECTIONAL DC-DC CONVERTER WITH CURRENT REFERENCE BY COMPARING THE VOLTAGE ERRORS OF THE LOW AND HIGH VOLTAGE SIDES

(71) Applicant: Samsung Electro-Mechanics Co., Ltd., Suwon-si (KR)

(72) Inventors: Min Sup Song, Suwon-si (KR); Young Dong Son, Suwon-si (KR); Kwang Hyun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 90 days.

(21) Appl. No.: 14/734,852

(22) Filed: Jun. 9, 2015

(65) Prior Publication Data

US 2016/0026205 A1    Jan. 28, 2016

(30) Foreign Application Priority Data

Jul. 24, 2014 (KR) ........................ 10-2014-0094038

(51) Int. Cl.
*H02M 3/158* (2006.01)
*G05F 3/08* (2006.01)
*H02J 7/00* (2006.01)

(52) U.S. Cl.
CPC ............... *G05F 3/08* (2013.01); *H02J 7/0054* (2013.01); *H02M 3/158* (2013.01)

(58) Field of Classification Search
CPC .......... H02J 7/0054; H02J 1/06; H02M 3/158; H02M 3/1588; H02M 3/33584
See application file for complete search history.

(56) References Cited

U.S. PATENT DOCUMENTS

| | | | | |
|---|---|---|---|---|
| 6,353,304 B1* | 3/2002 | Atcitty | ................. | H02J 7/0022 320/116 |
| 2007/0236975 A1* | 10/2007 | Lippojoki | ............. | H02J 7/0054 363/66 |
| 2010/0164446 A1* | 7/2010 | Matsuo | ................. | H02M 3/158 323/282 |
| 2015/0214766 A1* | 7/2015 | Shi | ........................ | H02J 7/0054 320/103 |

FOREIGN PATENT DOCUMENTS

KR      10-0997377 B1    11/2010

* cited by examiner

*Primary Examiner* — Harry Behm
(74) *Attorney, Agent, or Firm* — NSIP Law

(57) ABSTRACT

There are provided a power conversion mode control apparatus of a bi-directional DC-DC converter including: a controlling unit determining an overall reference current so as to perform a power conversion from a side in which an actual voltage is relatively larger than a reference voltage to a side in which the actual voltage is relatively smaller than the reference voltage by comparing a voltage error of low voltage side and a voltage error of high voltage side with each other; and a duty command generating unit generating duty command based on a difference between the overall reference current and a current of low voltage side and providing the duty command to the bi-directional DC-DC converter.

16 Claims, 10 Drawing Sheets

☐ : INITIAL VOLTAGE OF LOW VOLTAGE SIDE

■ : VOLTAGE OF LOW VOLTAGE SIDE AFTER CONTROL

△ : INITIAL VOLTAGE OF HIGH VOLTAGE SIDE

▲ : VOLTAGE OF HIGH VOLTAGE SIDE AFTER CONTROL

BI-DIRECTIONAL DC-DC CONVERTER WITH CURRENT REFERENCE BY COMPARING THE VOLTAGE ERRORS OF THE LOW AND HIGH VOLTAGE SIDES

CROSS-REFERENCE TO RELATED APPLICATION

This application claims the benefit of Korean Patent Application No. 10-2014-0094038, filed on Jul. 24, 2014, entitled "Power Conversion Mode Control Apparatus and Method of Bi-Directional DC-DC Converter and Bi-Directional DC-DC Converting Apparatus Including Power Conversion Mode Control Apparatus" which is hereby incorporated by reference in its entirety into this application.

BACKGROUND

The present disclosure relates to a power conversion mode control apparatus and method of a bi-directional DC-DC converter, and a bi-directional DC-DC converting apparatus including the power conversion mode control apparatus.

A hybrid electric vehicle (HEV) that uses an electric motor together with an existing internal combustion engine as a power unit has a bi-directional DC-DC converter which is operated in a boost mode or a buck mode between a battery of 48V, which is a high voltage battery and a battery of 12V, which is a low voltage battery.

An entire power system of the HEV includes a motor taking charge of an engine starting and regenerative braking, an inverter taking charge of a motor driving and regenerative power control, a high voltage battery used as an apparatus for an inverter driving and spare energy storage, a low voltage battery for driving an electric load, or the like, and a bi-directional DC-DC converter, which is a bi-directional power transfer medium between the high voltage battery and the low voltage battery.

The bi-directional DC-DC converter must be able to freely convert and transfer power in a bi-direction between a high voltage and a low voltage and needs to quickly and seamlessly implement a mode switching under various situations. Particularly, the bi-directional DC-DC converter needs to operate in a boost mode in order to implement a pre-charge at the time of an initial starting and quickly perform a switching of a power conversion mode into a buck mode after the pre-charge ends. In addition, the bi-directional DC-DC converter is operated in the boost mode even at the time of assisting in torque and transfers energy of a high voltage side to a low voltage side in other situations.

In the existing bi-directional DC-DC converter, if an external electric control unit (ECU) or a higher instructor determines a current power conversion mode and then instructs the DC-DC converter through CAN communication, the converter is passively operated in the boost mode or the buck mode by external instructions.

The bi-directional DC-DC converter which is operated by the instructions through the external CAN communication generates duty command for the low voltage side and the high voltage side, respectively, and is operated in the buck mode or the boost mode by selecting final duty command matched to the instruction when the external instruction is input to the DC-DC converter through the CAN communication.

Since the power conversion mode switching method determines a direction of the power conversion depending on the external instruction, in the case in which an external higher controller is broken down, the power conversion in a desired direction is not performed. In addition, a predetermined calculation time is required while the higher controller determines the buck mode or the boost mode from a voltage or current sensed value of the low voltage side or the high voltage side at the time of the mode switching, and a time lag occurs when the instruction is transferred to the converter by the CAN communication. Therefore, it is difficult to seamlessly and naturally switch the mode due to a sharp variation in the load at the time of the mode switching.

The following Related Art Document (Patent Document 1) relates to a bi-directional non-insulating DC-DC converter capable of reducing a current ripple of an inductor because a current of the inductor is operated in a continuous conduction mode (CCM), reducing switching loss and increasing a switching frequency by achieving a soft switching, removing a voltage surge due to reverse recovery characteristics of a diode by a soft switching operation, and making a rated voltage of the switch and the diode smaller than an output voltage.

RELATED ART DOCUMENT

Patent Document (Patent Document 1) KR10-0997377 B1

SUMMARY

An aspect of the present disclosure may provide a power conversion mode control apparatus of a bi-directional DC-DC converter capable of allowing the bi-directional DC-DC converter for oneself to seamlessly and naturally perform a power conversion toward minimized voltage error between a low voltage side and a high voltage side without a separate external instruction signal.

An aspect of the present disclosure may also provide a power conversion mode control method of a bi-directional DC-DC converter capable of allowing the bi-directional DC-DC converter for oneself to seamlessly and naturally perform a power conversion toward minimized voltage error between a low voltage side and a high voltage side without a separate external instruction signal.

An aspect of the present disclosure may also provide a bi-directional DC-DC converting apparatus including a power conversion mode control apparatus capable of seamlessly and naturally performing a power conversion toward minimized voltage error between a low voltage side and a high voltage side for oneself without a separate external instruction signal.

According to an aspect of the present disclosure, a power conversion mode control apparatus of a bi-directional DC-DC converter may include: a controlling unit determining an overall reference current so as to perform a power conversion from a side in which an actual voltage is relatively larger than a reference voltage to a side in which the actual voltage is relatively smaller than the reference voltage by comparing a voltage error of low voltage side and a voltage error of high voltage side with each other; and a duty command generating unit generating duty command based on a difference between the overall reference current and a current of low voltage side and providing the duty command to the bi-directional DC-DC converter.

The voltage error of low voltage side may be a value obtained by subtracting the actual voltage of low voltage side from the reference voltage of low voltage side; and the voltage error of high voltage side may be a value obtained by subtracting the actual voltage of high voltage side from the reference voltage of high voltage side; wherein the controlling unit may operate the bi-directional DC-DC converter in a boost mode by determining the overall reference current $I_{ref}$ as $I_{ref}=\max(|I_{H\_ref}|, |I_{L\_ref}|)$ in the case in which the voltage error of high voltage side is the voltage error of low voltage side or more and operate the bi-directional DC-DC converter in a buck mode by determining the overall reference current $I_{ref}$ as $I_{ref}=-\max(|I_{H\_ref}|, |I_{L\_ref}|)$ in the case in which the voltage error of high voltage side is less than the voltage error of low voltage side, based on the voltage error of low voltage side, the voltage error of high voltage side, the reference current $I_{L\_ref}$ of low voltage side, and the reference current $I_{H\_ref}$ of high voltage side.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
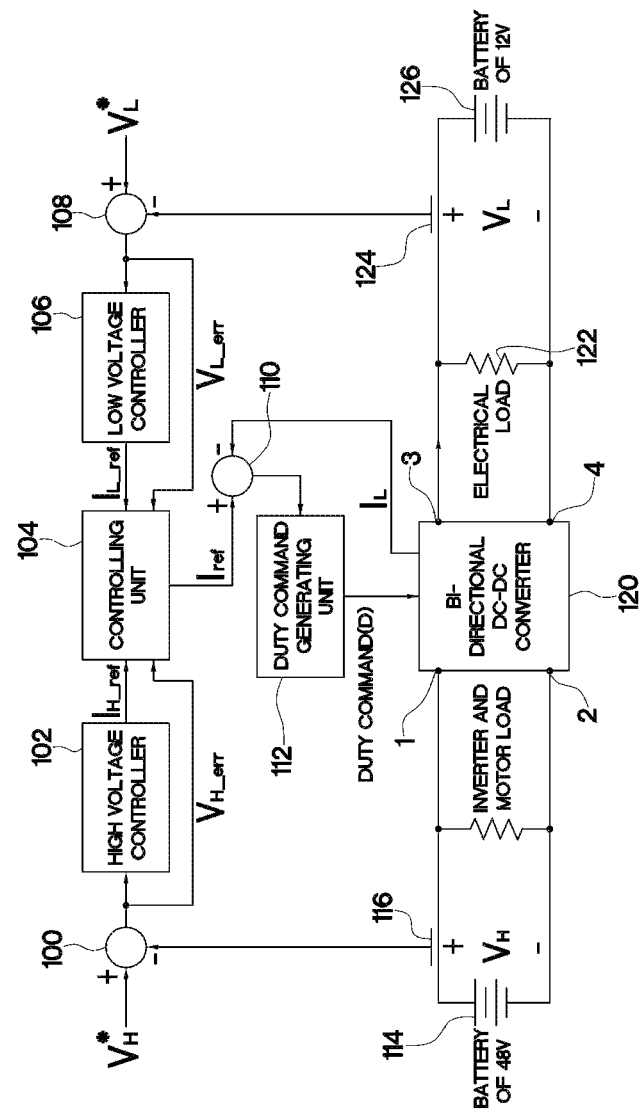
FIG. 1 is a drawing showing a bi-directional DC-DC converting apparatus to which a power conversion mode control apparatus of a bi-directional DC-DC converter according to an exemplary embodiment of the present disclosure is applied.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings.

FIG. 1 is a drawing showing a bi-directional DC-DC converting apparatus to which a power conversion mode control apparatus of a bi-directional DC-DC converter according to an exemplary embodiment of the present disclosure is applied.

A power conversion mode control apparatus of a bi-directional DC-DC converter according to an exemplary embodiment of the present disclosure shown in FIG. 1 includes a first subtractor 108 generating a voltage error $V_{L\_err}$ of low voltage side, which is a difference between an actual voltage $V_L$ of low voltage side sensed by a low voltage sensor 124 and a reference voltage $V_L^*$ of low voltage side, a low voltage controller 106 generating a reference current $I_{L\_ref}$ of low voltage side based on the voltage error $V_{L\_err}$ of low voltage side, a second subtractor 100 generating a voltage error $V_{H\_err}$ of high voltage side, which is a difference between an actual voltage $V_H$ of high voltage side sensed by a high voltage sensor 116 and a reference voltage $V_H^*$ of high voltage side, a high voltage controller 102 generating a reference current $I_{H\_ref}$ of high voltage side based on the voltage error $V_{H\_err}$ of high voltage side, a controlling unit 104 determining an overall reference current $I_{ref}$ so as to perform a power conversion from a side in which the actual voltages $V_L$ and $V_H$ are relatively larger than the reference voltages $V_L^*$ and $V_H^*$ to a side in which the actual voltages $V_L$ and $V_H$ are relatively smaller than the reference voltages $V_L^*$ and $V_H^*$ by comparing the voltage error $V_{L\_err}$ of low voltage side and the voltage error $V_{H\_err}$ of high voltage side with each other, a third subtractor 110 generating a difference between the overall reference current $I_{ref}$ output from the controlling unit 104 and the current $I_L$ of low voltage side, and a duty command generating unit 112 generating a duty command D based on the difference between the overall reference current $I_{ref}$ and the current $I_L$ of low voltage side so as to provide the duty command to the bi-directional DC-DC converter 120.

The duty command D is a signal having a duty ratio which is varied depending on the difference between the overall reference current $I_{ref}$ and the current $I_L$ of low voltage side.

In FIG. 1, a reference numeral 114 denotes a battery of 48V, which is a high voltage battery, a reference numeral 118 denotes an inverter and motor load, a reference numeral 122 denotes an electrical load, and a reference numeral 126 denotes a battery of 12V, which is a low voltage battery.

An operation of the power conversion mode control apparatus of the bi-directional DC-DC converter according to an exemplary embodiment of the present disclosure configured as described above will be described below.

In the power conversion mode control apparatus of the bi-directional DC-DC converter according to an exemplary embodiment of the present disclosure, current control loops of low voltage side and high voltage side are not independent from each other and one current control loop is shared by the low voltage side and the high voltage side.

In the power conversion mode control apparatus of the bi-directional DC-DC converter according to an exemplary embodiment of the present disclosure, the controlling unit 104 determines an overall reference current $I_{ref}$ so as to perform a power conversion from a side in which the actual voltages $V_L$ and $V_H$ are relatively larger than the reference voltages $V_L^*$ and $V_H^*$ to a side in which the actual voltages $V_L$ and $V_H$ are relatively smaller than the reference voltages $V_L^*$ and $V_H^*$ by comparing the voltage error $V_{L\_err}$ of low voltage side and the voltage error $V_{H\_err}$ of high voltage side with each other, thereby determining a power conversion mode for oneself so as to perform the power conversion.

First, the actual voltages $V_L$ and $V_H$ of the low voltage battery 126 and the high voltage battery 114, respectively are sensed by the low voltage sensor 124 and the high voltage sensor 116. The actual voltage $V_L$ of low voltage side of the low voltage battery 126 is subtracted from the reference voltage $V_L^*$ of low voltage side by the first subtractor 108 so as to generate the voltage error $V_{L\_err}$ of low voltage side, and the actual voltage $V_H$ of high voltage side of the high voltage battery 114 is subtracted from the reference voltage $V_H^*$ of high voltage side by the second subtractor 100 so as to generate the voltage error $V_{H\_err}$ of high voltage side.

The low voltage controller 106 generates the reference current $I_{L\_ref}$ of low voltage side based on the voltage error $V_{L\_err}$ of low voltage side and the high voltage controller 102 generates the reference current $I_{H\_ref}$ of high voltage side based on the voltage error $V_{H\_err}$ of high voltage side.

The controlling unit 104 determines and outputs the overall reference current $I_{ref}$ so as to minimize two voltage errors $V_{L\_err}$ and $V_{H\_err}$, that is, to balance magnitudes of the two voltage errors $V_{L\_err}$ and $V_{H\_err}$, based on the voltage error $V_{L\_err}$ of low voltage side, the voltage error $V_{H\_err}$ of high voltage side, the reference current $I_{L\_ref}$ of low voltage side, and the reference current $I_{H\_ref}$ of high voltage side.

According to an exemplary embodiment of the present disclosure, the controlling unit 104 determines the overall reference current $I_{ref}$ so as to perform the power conversion from a side in which the voltage error is small to a side in which the voltage error is large, until the voltage error $V_{L\_err}$ of low voltage side and the voltage error $V_{H\_err}$ of high voltage side are equal to each other, in order to minimize the two voltage errors $V_{L\_err}$ and $V_{H\_err}$.

An operation of determining, by the controlling unit 104, the overall reference current $I_{ref}$ so as to perform the power conversion from a side in which the voltage error is small to a side in which the voltage error is large in order to minimize the two voltage errors $V_{L\_err}$ and $V_{H\_err}$ will be described in detail with reference to the flow chart showing a method of determining the overall reference current for the power conversion mode switching shown in FIG. 3.

Figure 3:
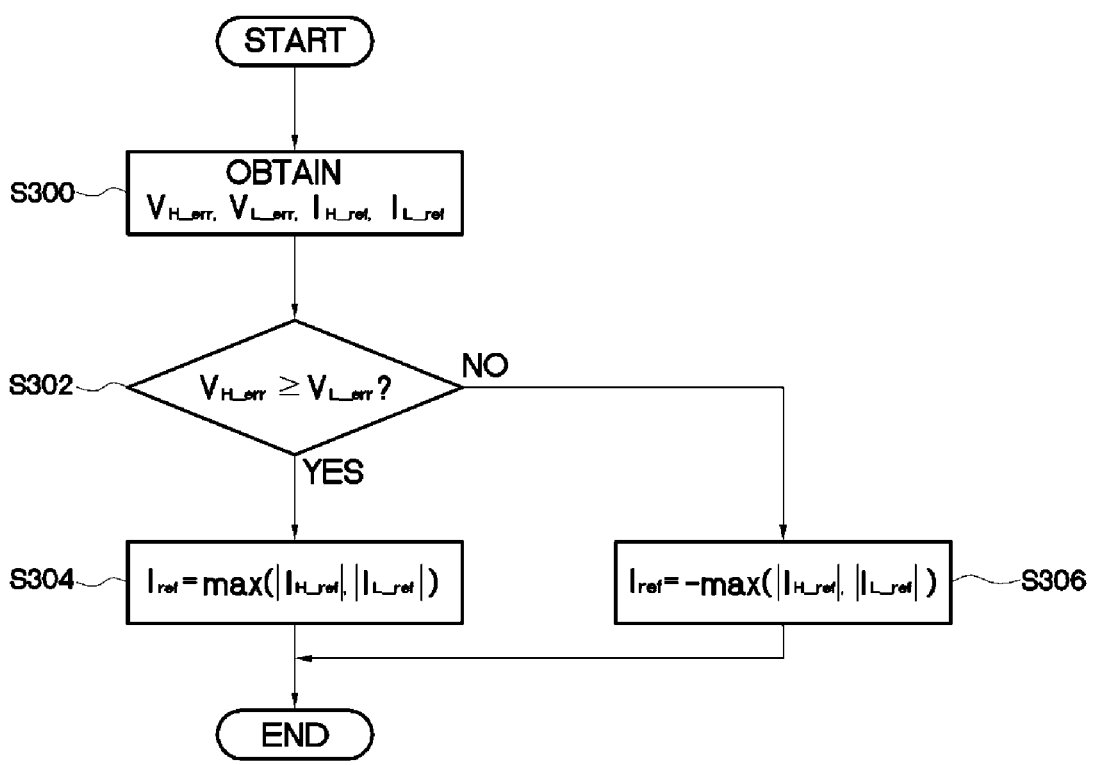
FIG. 3 is a flow chart showing a method of determining an overall reference current for a power conversion mode switching performed by a controlling unit shown in FIG. 1.

Referring to FIG. 3, in S300, the controlling unit 104 obtains the voltage error $V_{L\_err}$ of low voltage side, the voltage error $V_{H\_err}$ of high voltage side, the reference current $I_{L\_ref}$ of low voltage side, and the reference current $I_{H\_ref}$ of high voltage side.

In S302, the controlling unit 104 compares the voltage error $V_{L\_err}$ of low voltage side and the voltage error $V_{H\_err}$ of high voltage side with each other. That is, the controlling unit 104 determines whether or not the voltage error $V_{H\_err}$ of high voltage side is the voltage error $V_{L\_err}$ of low voltage side or more.

In the case in which the voltage error $V_{H\_err}$ of high voltage side is the voltage error $V_{L\_err}$ of low voltage side or more, in S304, the controlling unit 104 determines the overall reference current $I_{ref}$ as $I_{ref}=\max(|I_{H\_ref}|, |I_{L\_ref}|)$ and outputs it to the bi-directional DC-DC converter 120.

In the case in which the voltage error $V_{H\_err}$ of high voltage side is less than the voltage error $V_{L\_err}$ of low voltage side, in S306, the controlling unit 104 determines the overall reference current $I_{ref}$ as $I_{ref}=-\max(|I_{H\_ref}|, |I_{L\_ref}|)$ and outputs it to the bi-directional DC-DC converter 120.

The third subtractor 110 subtracts the current $I_L$ of low voltage side from the overall reference current $I_{ref}$ output from the controlling unit 104, and the duty command generating unit 112 generates the duty command D based on a difference between the overall reference current $I_{ref}$ and the current $I_L$ of low voltage side which is output from the third subtractor 110 and provides it to the bi-directional DC-DC converter 120.

Figure 2:
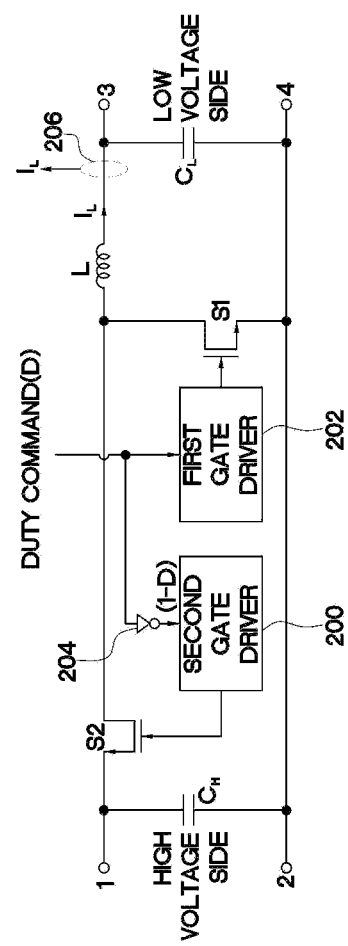
FIG. 2 is a detailed view of the bi-directional DC-DC converter shown in FIG. 1.

FIG. 2 is a detailed view of the bi-direction DC-DC converter 120 shown in FIG. 1; The bi-directional DC-DC converter 120 shown in FIG. 2 includes a first gate driver 202 outputting a first switching control signal according to the duty command D output from the duty command generating unit 112, an inverter 204 for inverting the duty command D, a second gate driver 200 outputting a second switching control signal according to an output of the inverter 204, a capacitor $C_L$ of low voltage side connected to both ends of the low voltage battery 126, an inductor L having one end connected to an anode of the low voltage battery 126, a first switch S1 having one end connected to the other end of the inductor L and the other end connected to a cathode of the low voltage battery 126 and switched according to the first switching control signal, a capacitor $C_H$ of high voltage side connected to both ends of the high voltage battery 114, a second switch S2 having one end connected to the anode of the high voltage battery 114 and the other end connected to the other end of the inductor L and switched according to the second switching control signal, and a current sensor 206 for sensing the current $I_L$ of low voltage side flowing through the inductor L.

The bi-directional DC-DC converter 120 shown in FIG. 2 is an illustrative bi-directional DC-DC converter to which the power conversion mode control apparatus according to an exemplary embodiment of the present disclosure may be applied, and the power conversion mode control apparatus of the bi-directional DC-DC converter according to an exemplary embodiment of the present disclosure may be applied to any type of bi-direction DC-DC converter operated in the boost mode or the buck mode according to the duty command D as well as the bi-directional DC-DC converter shown in FIG. 2.

The bi-directional DC-DC converter 120 shown in FIG. 2 is operated in the boost mode or the buck mode by controlling a switching operation of the first switch S1 or the second switch S2 according to the duty command D output from the duty command generating unit 112.

In the boost mode, the power conversion from the low voltage side to the high voltage side is performed, and in the buck mode, the power conversion from the high voltage side to the low voltage side is performed.

According to an exemplary embodiment of the present disclosure, magnitude of the overall reference current $I_{ref}$ output from the controlling unit 104 is determined as a reference current value corresponding to source power at the time of a mode switching, whereby the DC-DC converter 120 is operated to minimize a voltage error of the source power.

According to an exemplary embodiment of the present disclosure, a current direction in case of the boost mode has been set as a positive (+) direction. Therefore, in the case in which the voltage error $V_{H\_err}$ of high voltage side is the voltage error $V_{L\_err}$ of low voltage side or more, the overall reference current $I_{ref}$ becomes positive (+) and the current $I_L$ of low voltage side follows the positive direction, such that the DC-DC converter 120 is operated in the boost mode, and in the case in which the voltage error $V_{H\_err}$ of high voltage side is less than the voltage error $V_{L\_err}$ of low voltage side, the overall reference current $I_{ref}$ becomes negative (−) and the current IL of low voltage side follows the negative direction, such that the DC-DC converter 120 is operated in the buck mode.

FIGS. 4A to 4F are drawings showing all power conversion mode switching aspects that are able to occur according to voltage states of a low voltage battery and a high voltage battery.

Figure 4A:
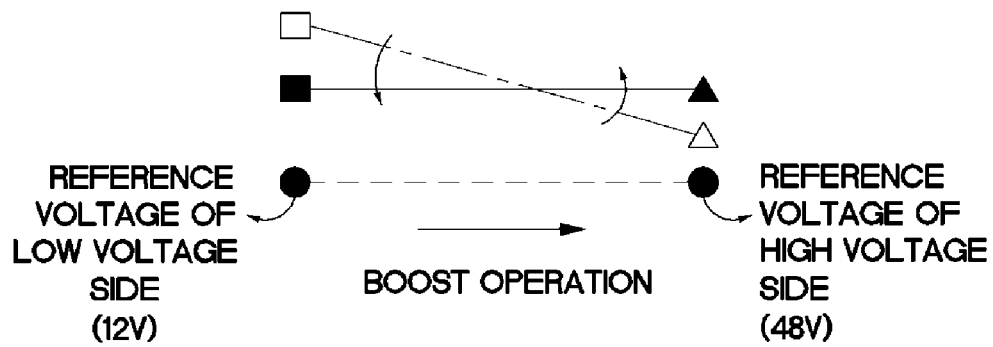
FIGS. 4A to 4F are drawings showing all power conversion mode switching aspects that are able to occur according to voltage states of a low voltage battery and a high voltage battery.

FIG. 4A illustrates a case in which the actual voltage $V_L$ of low voltage side and the actual voltage $V_H$ of high voltage side are all larger than the reference voltages $V_L^*$ and $V_H^*$, respectively. Since the voltage error is a value obtained by subtracting the actual voltage from the reference voltage, the low voltage side and the high voltage side all have a negative voltage error and $V_{H\_err} \geq V_{L\_err}(<0V)$.

According to the method of determining the overall reference current $I_{ref}$ shown in FIG. 3, since the overall reference current $I_{ref}$ becomes $I_{ref}=\max(|I_{H\_ref}|, |I_{L\_ref}|)$ and has a positive value, the bi-directional DC-DC converter 120 is operated in the boost mode. Therefore, since the low voltage side becomes the source power and the high voltage side becomes the load, the voltage of low voltage side is decreased and the voltage of high voltage side is increased while power is transferred from the low voltage side to the high voltage side. Therefore, the bi-directional DC-DC converter 120 is operated in the boost mode until the two voltage errors are equal to each other, so as to minimize the error $V_{L\_err}$ of low voltage side and the error $V_{H\_err}$ of high voltage side. That is, FIG. 4A illustrates a case in which $V_{H\_err}<0$, $V_{L\_err}<0$, $V_{H\_err} \geq V_{L\_err}$, $I_{ref}=\max(|I_{H\_ref}|, |I_{L\_ref}|)$.

Figure 4B:
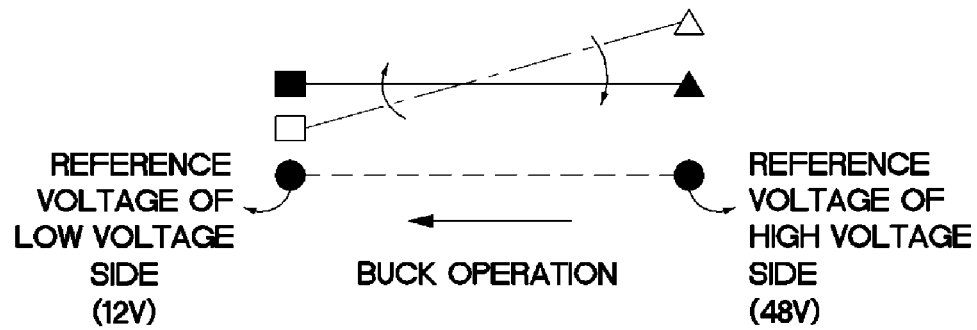

FIG. 4B also illustrates a case in which the voltage $V_L$ of low voltage side and the voltage $V_H$ of high voltage side are all larger than the reference voltages $V_L^*$ and $V_H^*$, respectively. Unlike FIG. 4A, however, since the case of FIG. 4B is the case in which the voltage $V_H$ of high voltage side is excessively large, the bi-directional DC-DC converter 120 is operated toward a decreased in the voltage error $V_{H\_err}$ of high voltage side. Actually, $V_{H\_err}<V_{L\_err}$ (<0V).

According to the method of determining the overall reference current $I_{ref}$ shown in FIG. 3, since the overall reference current $I_{ref}$ becomes $I_{ref}=-\max(|I_{H\_ref}|, |I_{L\_ref}|)$ and has a negative value, the bi-directional DC-DC converter 120 is operated in the buck mode. Therefore, since the high voltage side becomes the source power and the low voltage side becomes the load, the voltage of high voltage side is decreased and the voltage of low voltage side is increased while power is transferred from the high voltage side to the low voltage side. Therefore, the bi-directional DC-DC converter 120 is operated in the buck mode until the two voltage errors are equal to each other, so as to minimize the error $V_{L\_err}$ of low voltage side and the error $V_{H\_err}$ of high voltage side. That is, FIG. 4B illustrates a case in which $V_{H\_err}<0$, $V_{L\_err}<0$, $V_{H\_err}<V_{L\_err}$, $I_{ref}=-\max(|I_{H\_ref}|, |I_{L\_ref}|)$.

Figure 4C:
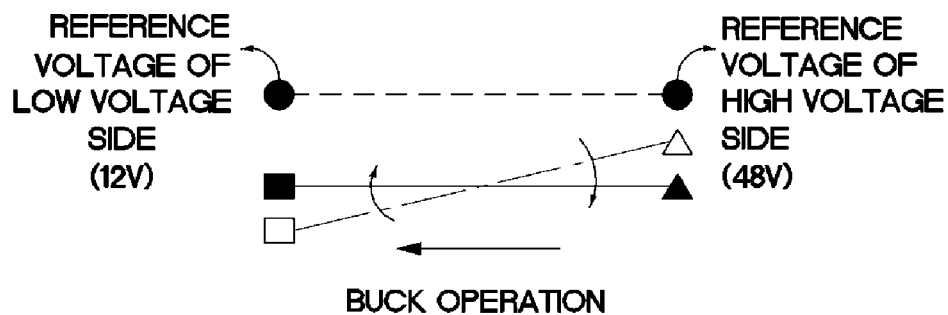

FIG. 4C illustrates a case in which the voltage $V_L$ of low voltage side and the voltage $V_H$ of high voltage side are all smaller than the reference voltages $V_L^*$ and $V_H^*$, respectively. The low voltage side and the high voltage side all have a positive voltage error, and $V_{H\_err}<V_{L\_err}$(>0V).

According to the method of determining the overall reference current $I_{ref}$ shown in FIG. 3, since the overall reference current $I_{ref}$ becomes $I_{ref}=-\max(|I_{H\_ref}|, |I_{L\_ref}|)$ and has a negative value, the bi-directional DC-DC converter 120 is operated in the buck mode. Therefore, since the high voltage side becomes the source power and the low voltage side becomes the load, the voltage of high voltage side is decreased and the voltage of low voltage side is increased while power is transferred from the high voltage side to the low voltage side. Therefore, the bi-directional DC-DC converter 120 is operated in the buck mode until the two voltage errors are equal to each other, so as to minimize the error $V_{L\_err}$ of low voltage side and the error $V_{H\_err}$ of high voltage side. That is, FIG. 4C illustrates a case in which $V_{H\_err}>0$, $V_{L\_err}>0$, $V_{H\_err}<V_{L\_err}$, $I_{ref}=-\max(|I_{H\_ref}|, |I_{L\_ref}|)$.

Figure 4D:
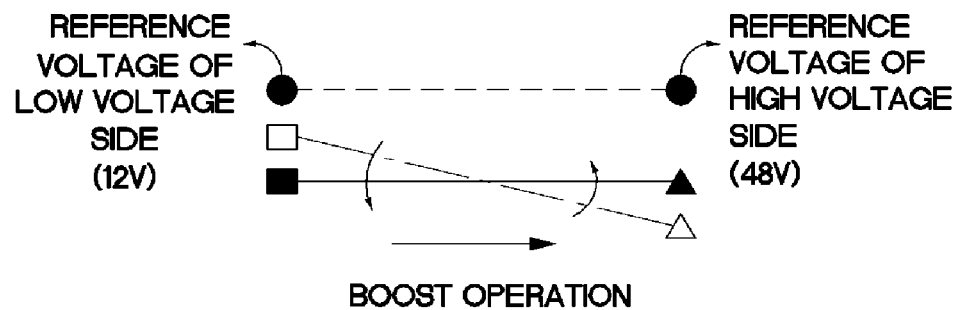

FIG. 4D illustrates a case in which the voltage $V_L$ of low voltage side and the voltage $V_H$ of high voltage side are all smaller than the reference voltages $V_L^*$ and $V_H^*$, respectively. The low voltage side and the high voltage side all have a positive voltage error, and $V_{H\_err} \geq V_{L\_err}$(>0V).

According to the method of determining the overall reference current $I_{ref}$ shown in FIG. 3, since the overall reference current $I_{ref}$ becomes $I_{ref}=\max(|I_{H\_ref}|, |I_{L\_ref}|)$ and has a positive value, the bi-directional DC-DC converter 120 is operated in the boost mode. Therefore, since the low voltage side becomes the source power and the high voltage side becomes the load, the voltage of low voltage side is decreased and the voltage of high voltage side is increased while power is transferred from the low voltage side to the high voltage side. Therefore, the bi-directional DC-DC converter 120 is operated in the boost mode until the two voltage errors are equal to each other, so as to minimize the error $V_{L\_err}$ of low voltage side and the error $V_{H\_err}$ of high voltage side. That is, FIG. 4D illustrates a case in which $V_{H\_err}>0$, $V_{L\_err}>0$, $V_{H\_err} \geq V_{L\_err}$, $I_{ref}=\max(|I_{H\_ref}|, |I_{L\_ref}|)$.

Figure 4E:
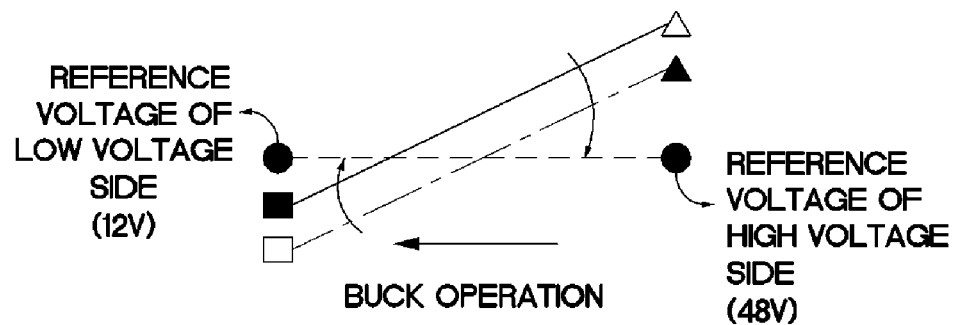

FIG. 4E illustrates a case in which the voltage $V_L$ of low voltage side is smaller than the reference voltage $V_L^*$ of low voltage side and the voltage $V_H$ of high voltage side is larger than the reference voltage $V_H^*$ of high voltage side. The error $V_{L\_err}$ of low voltage side has a positive voltage error, the error $V_{H\_err}$ of high voltage side has a negative voltage error, and $V_{H\_err}<V_{L\_err}$.

According to the method of determining the overall reference current $I_{ref}$ shown in FIG. 3, since the overall reference current $I_{ref}$ becomes $I_{ref}=-\max(|I_{H\_ref}|, |I_{L\_ref}|)$ and has a negative value, the bi-directional DC-DC converter 120 is operated in the buck mode. Therefore, since the high voltage side becomes the source power and the low voltage side becomes the load, the voltage of high voltage side is decreased and the voltage of low voltage side is increased while power is transferred from the high voltage side to the low voltage side. Therefore, the bi-directional DC-DC converter 120 is operated in the buck mode until the two voltage errors are equal to each other, so as to minimize the error $V_{L\_err}$ of low voltage side and the error $V_{H\_err}$ of high voltage side. That is, FIG. 4E illustrates a case in which $V_{H\_err}<0$, $V_{L\_err}>0$, $V_{H\_err}<V_{L\_err}$, $I_{ref}=-\max(|I_{H\_ref}|, |I_{L\_ref}|)$.

Figure 4F:
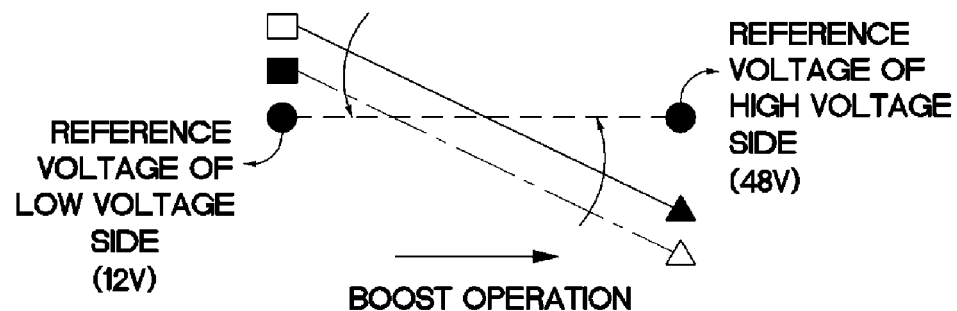

FIG. 4F illustrates a case in which the voltage $V_L$ of low voltage side is larger than the reference voltage $V_L^*$ of low voltage side and the voltage $V_H$ of high voltage side is smaller than the reference voltage $V_H^*$ of high voltage side. The error $V_{L\_err}$ of low voltage side has a negative voltage error, the error $V_{H\_err}$ of high voltage side has a positive voltage error, and $V_{H\_err} \geq V_{L\_err}$.

According to the method of determining the overall reference current $I_{ref}$ shown in FIG. 3, since the overall reference current $I_{ref}$ becomes $I_{ref}=\max(|I_{H\_ref}|, |I_{L\_ref}|)$ and has a positive value, the bi-directional DC-DC converter 120 is operated in the boost mode. Therefore, since the low voltage side becomes the source power and the high voltage side becomes the load, the voltage of low voltage side is decreased and the voltage of high voltage side is increased while power is transferred from the low voltage side to the high voltage side. Therefore, the bi-directional DC-DC converter 120 is operated in the boost mode until the two voltage errors are equal to each other, so as to minimize the error $V_{L\_err}$ of low voltage side and the error $V_{H\_err}$ of high voltage side.

In the case in which the method of determining the overall reference current $I_{ref}$ shown in FIG. 3 is applied to all cases that are able to actually occur, it is possible to naturally switch a mode so as to minimize the error $V_{L\_err}$ of low voltage side and the error $V_{H\_err}$ of high voltage side, that is, to balance the voltage errors $V_{L\_err}$ and $V_{H\_err}$. That is, FIG.

4F illustrates a case in which $V_{H\_err}>0$, $V_{L\_err}<0$, $V_{H\_err}\geq V_{L\_err}$, $I_{ref}=\max(|I_{H\_ref}|, |I_{L\_ref}|)$.

Figure 5:
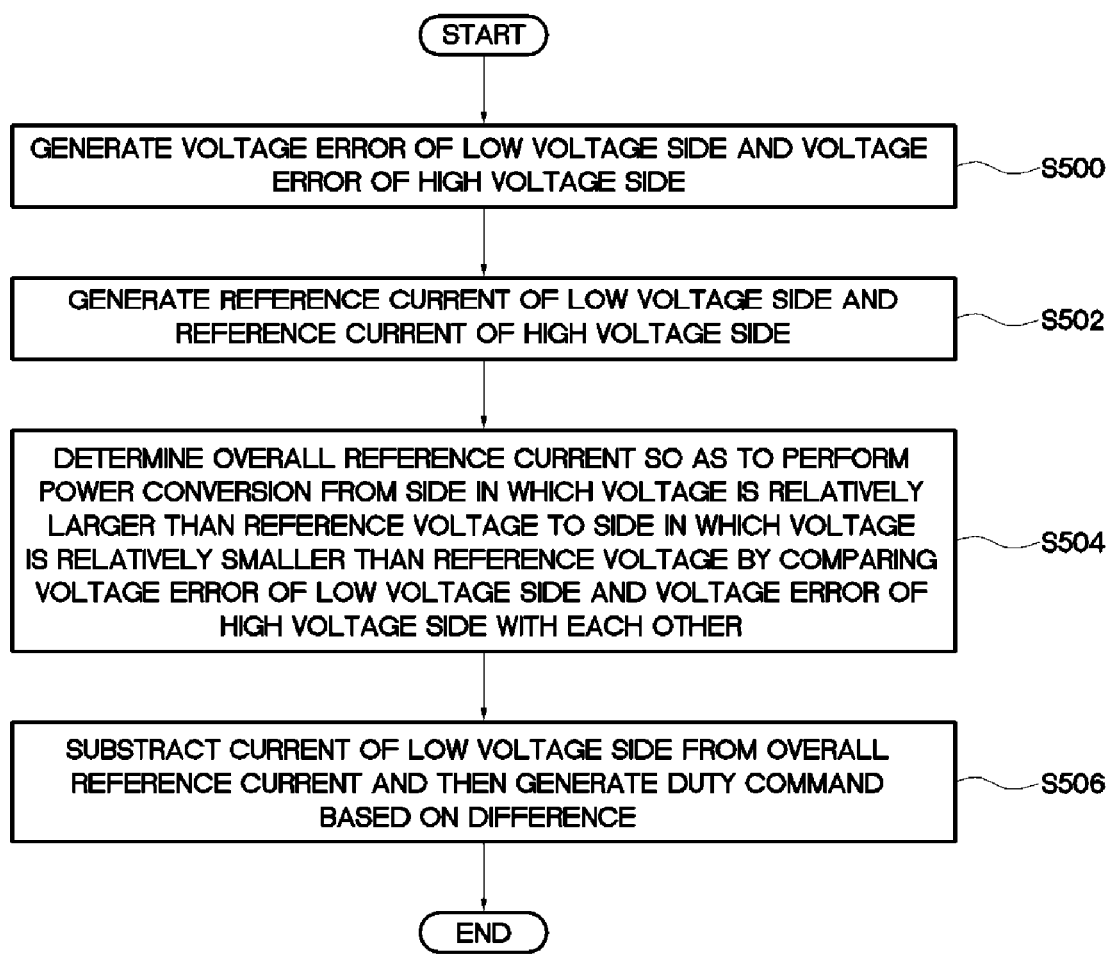
FIG. 5 is a flow chart showing a power conversion mode control method of a bi-directional DC-DC converter according to an exemplary embodiment of the present disclosure.

FIG. 5 is a flow chart showing a power conversion mode control method of a bi-directional DC-DC converter according to an exemplary embodiment of the present disclosure.

In S500, the first subtractor 108 subtracts the voltage $V_L$ of low voltage side sensed by the low voltage sensor 124 from the reference voltage $V_L^*$ of low voltage side, so as to generate the voltage error $V_{L\_err}$ of low voltage side. In addition, the second subtractor 100 subtracts the voltage $V_H$ of high voltage side sensed by the high voltage sensor 116 from the reference voltage $V_H^*$ of high voltage side, so as to generate the voltage error $V_{H\_err}$ of high voltage side.

In S502, the low voltage controller 106 generates the reference current $I_{L\_ref}$ of low voltage side based on the voltage error $V_{L\_err}$ of low voltage side and the high voltage controller 102 generates the reference current $I_{H\_ref}$ of high voltage side based on the voltage error $V_{H\_err}$ of high voltage side.

In S504, the controlling unit 104 determines the overall reference current $I_{ref}$ so as to perform the power conversion from a side in which the actual voltage is relatively larger than the reference voltage to a side in which the actual voltage is relatively smaller than the reference voltage, until the voltage error $V_{L\_err}$ of low voltage side and the voltage error $V_{H\_err}$ of high voltage side are equal to each other, by comparing the voltage error $V_{L\_err}$ of low voltage side and the voltage error $V_{H\_err}$ of high voltage side with each other.

A detail description thereof will be provided below. The controlling unit 104 operates the bi-directional DC-DC converter 120 in the boost mode by determining the overall reference current $I_{ref}$ as $I_{ref}=\max(|I_{H\_ref}|, |I_{L\_ref}|)$ in the case in which the voltage error $V_{H\_err}$ of high voltage side is the voltage error $V_{L\_err}$ of low voltage side or more, until the voltage error $V_{L\_err}$ of low voltage side and the voltage error $V_{H\_err}$ of high voltage side are equal to each other, and operates the bi-directional DC-DC converter 120 in the buck mode by determining the overall reference current $I_{ref}$ as $I_{ref}=-\max(|I_{H\_ref}|, |I_{L\_ref}|)$ in the case in which the voltage error $V_{H\_err}$ of high voltage side is less than the voltage error $V_{L\_err}$ of low voltage side.

In S506, the third subtractor 110 subtracts the current $I_L$ of low voltage side from the overall reference current $I_{ref}$ output from the controlling unit 104, and the duty command generating unit 112 generates the duty command D based on a difference between the overall reference current $I_{ref}$ and the current $I_L$ of low voltage side and provides it to the bi-directional DC-DC converter 120.

The bi-directional DC-DC converter 120 is operated in the boost mode or the buck mode according to the duty command D output from the duty command generating unit 112, so as to perform the power conversion from a side in which the actual voltage is relatively larger than the reference voltage to a side in which the actual voltage is relatively smaller than the reference voltage. Thereby, it is possible to naturally switch the mode so as to minimize the voltage error $V_{L\_err}$ of low voltage side and the voltage error $V_{H\_err}$ of high voltage side, that is, to balance the voltage errors $V_{L\_err}$ and $V_{H\_err}$.

In the power conversion mode control apparatus and method of the bi-directional DC-DC converter according to an exemplary embodiment of the present disclosure, as compared to a mode switching determined by an external higher instructor, a current controller of low voltage side and a current controller of high voltage side are integrated into one and the bi-directional DC-DC converter may naturally and seamlessly switch the mode toward minimization of the voltage error of low voltage side and the voltage error of high voltage side for oneself without an external instructions.

That is, even in the case in which instructions are not given due to a fault occurring in the higher instructor, the DC-DC converter is autonomously operated toward the minimization of the voltage errors of low voltage side and high voltage side. In addition, there is no a time lag due to a calculation time of the higher instructor and CAN communication, and the current controllers are integrated into one, thereby making a configuration of the current controller simple.

Since a basic concept of the power conversion mode control apparatus and method of the bi-directional DC-DC converter according to an exemplary embodiment of the present disclosure is that the power conversion is performed from a side in which the actual voltage is relatively larger than the reference voltage to a side in which the actual voltage is relatively smaller than the reference voltage by sending the voltage of low voltage side and the voltage of high voltage side, the bi-directional DC-DC converter is operated toward the minimization of the overall voltage error in the respective load conditions, so as to seamlessly and naturally perform a mode switching operation between the boost mode and the buck mode. In addition, the mode switching may be naturally performed in all load conditions which are able to occur at the time of an actual battery connection.

As set forth above, according to the exemplary embodiments of the present disclosure, in the power conversion mode control apparatus and method of the bi-directional DC-DC converter, the bi-directional DC-DC converter may seamlessly and naturally switch the power conversion mode for oneself toward the minimization of the voltage errors of the low voltage battery and the high voltage battery without the external instructions.

In addition, in the power conversion mode control apparatus and method of the bi-directional DC-DC converter according to the exemplary embodiment of the present disclosure, since the power conversion mode is autonomously determined based on the reference voltages of the low voltage battery and the high voltage battery and the actual voltage so as to perform the power conversion, the bi-directional DC-DC converter may be flexible in responding to the fault even in the case in which the external instructions are not given when the fault occurs in the higher instructor, and since there is no the time lag due to the calculation time of the higher instructor and the CAN communication, the power conversion mode may be seamlessly and naturally switched even in the case in which the sharp variation in the load occurs.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. A power conversion mode control apparatus of a bi-directional DC-DC converter, the power conversion mode control apparatus comprising:
 a controlling unit determining an overall reference current so as to perform a power conversion from a side in which an actual voltage is relatively larger than a reference voltage to a side in which the actual voltage is relatively smaller than the reference voltage by comparing a voltage error of low voltage side and a voltage error of high voltage side with each other; and a duty command generating unit generating duty command based on a difference between the overall reference current and a current of low voltage side and providing the duty command to the bi-directional DC-DC converter.

2. The power conversion mode control apparatus of claim 1, wherein the controlling unit determines the overall reference current so as to perform the power conversion from the side in which the actual voltage is relatively larger than the reference voltage to the side in which the actual voltage is relatively smaller than the reference voltage until the voltage error of low voltage side and the voltage error of high voltage side are equal to each other.

3. The power conversion mode control apparatus of claim 2, further comprising:
a first subtractor generating the voltage error of low voltage side, which is a difference between the actual voltage of low voltage side and a reference voltage of low voltage side;
a low voltage controller generating a reference current $I_{L\_ref}$ of low voltage side based on the voltage error of low voltage side;
a second subtractor generating the voltage error of high voltage side, which is a difference between the actual voltage of high voltage side and a reference voltage of high voltage side; and
a high voltage controller generating a reference current $I_{H\_ref}$ of high voltage side based on the voltage error of high voltage side.

4. The power conversion mode control apparatus of claim 3, wherein the voltage error of low voltage side is a value obtained by subtracting the actual voltage of low voltage side from the reference voltage of low voltage side; and
the voltage error of high voltage side is a value obtained by subtracting the actual voltage of high voltage side from the reference voltage of high voltage side;
the controlling unit operates the bi-directional DC-DC converter in a boost mode by determining the overall reference current $I_{ref}$ as $I_{ref}=\max(|I_{H\_ref}|, |I_{L\_ref}|)$ in the case in which the voltage error of high voltage side is the voltage error of low voltage side or more and operates the bi-directional DC-DC converter in a buck mode by determining the overall reference current $I_{ref}$ as $I_{ref}=-\max(|I_{H\_ref}|, |I_{L\_ref}|)$ in the case in which the voltage error of high voltage side is less than the voltage error of low voltage side, based on the voltage error of low voltage side, the voltage error of high voltage side, the reference current $I_{L\_ref}$ of low voltage side, and the reference current $I_{H\_ref}$ of high voltage side.

5. The power conversion mode control apparatus of claim 4, further comprising a third subtractor generating a difference between the overall reference current output from the controlling unit and the current of low voltage side.

6. The power conversion mode control apparatus of claim 5, further comprising:
a low voltage sensor sensing the actual voltage of low voltage side; and
a high voltage sensor sensing the actual voltage of high voltage side.

7. A power conversion mode control method of a bi-directional DC-DC converter, the power conversion mode control method comprising:
(A) determining an overall reference current so as to perform a power conversion from a side in which an actual voltage is relatively larger than a reference voltage to a side in which the actual voltage is relatively smaller than the reference voltage by comparing a voltage error of low voltage side and a voltage error of high voltage side with each other; and
(B) generating duty command based on a difference between the overall reference current and a current of low voltage side and providing the duty command to the bi-directional DC-DC converter.

8. The power conversion mode control method of claim 7, wherein the operation (A) includes determining the overall reference current so as to perform the power conversion from the side in which the actual voltage is relatively larger than the reference voltage to the side in which the actual voltage is relatively smaller than the reference voltage until the voltage error of low voltage side and the voltage error of high voltage side are equal to each other.

9. The power conversion mode control method of claim 8, wherein the voltage error of low voltage side is a value obtained by subtracting the actual voltage of low voltage side from the reference voltage of low voltage side; and
the voltage error of high voltage side is a value obtained by subtracting the actual voltage of high voltage side from the reference voltage of high voltage side;
the operation (A) includes:
(A1) generating the voltage error of low voltage side, which is a difference between the actual voltage of low voltage side and a reference voltage of low voltage side;
(A2) generating a reference current $I_{L\_ref}$ of low voltage side by receiving the voltage error of low voltage side;
(A3) generating the voltage error of high voltage side, which is a difference between the actual voltage of high voltage side and a reference voltage of high voltage side;
(A4) generating a reference current $I_{H\_ref}$ of high voltage side by receiving the voltage error of high voltage side;
(A5) operating the bi-directional DC-DC converter in a boost mode by determining the overall reference current $I_{ref}$ as $I_{ref}=\max(|I_{H\_ref}|, |I_{L\_ref}|)$ in the case in which the voltage error of high voltage side is the voltage error of low voltage side or more;
(A6) operating the bi-directional DC-DC converter in a buck mode by determining the overall reference current $I_{ref}$ as $I_{ref}=-\max(|I_{H\_ref}|, |I_{L\_ref}|)$ in the case in which the voltage error of high voltage side is less than the voltage error of low voltage side.

10. The power conversion mode control method of claim 9, wherein the operation (B) includes:
(B1) subtracting the current of low voltage side from the overall reference current $I_{ref}$; and
(B2) generating duty command based on a difference between the overall reference current $I_{ref}$ and a current of low voltage side and providing the duty command to the bi-directional DC-DC converter.

11. A bi-directional DC-DC converting apparatus including a power conversion mode control apparatus, the bi-directional DC-DC converting apparatus comprising:
the power conversion mode control apparatus including a controlling unit determining an overall reference current so as to perform a power conversion from a side in which an actual voltage is relatively larger than a reference voltage to a side in which the actual voltage is relatively smaller than the reference voltage by comparing a voltage error of low voltage side and a voltage error of high voltage side with each other; and a duty command generating unit generating duty command based on a difference between the overall reference current and a current of low voltage side and providing a duty command to the bi-directional DC-DC converter; and the bi-directional DC-DC converter operated in a boost mode or a buck mode according to the duty command.

12. The bi-directional DC-DC converting apparatus of claim 11, wherein the controlling unit determines the overall reference current so as to perform the power conversion from the side in which the actual voltage is relatively larger than the reference voltage to the side in which the actual voltage is relatively smaller than the reference voltage until the voltage error of low voltage side and the voltage error of high voltage side are equal to each other.

13. The bi-directional DC-DC converting apparatus of claim 12, wherein the power conversion mode control apparatus further includes:

a first subtractor generating the voltage error of low voltage side, which is a difference between the actual voltage of low voltage side and a reference voltage of low voltage side;

a low voltage controller generating a reference current $I_{L\_ref}$ of low voltage side based on the voltage error of low voltage side;

a second subtractor generating the voltage error of high voltage side, which is a difference between the actual voltage of high voltage side and a reference voltage of high voltage side; and a high voltage controller generating a reference current $I_{H\_ref}$ of high voltage side based on the voltage error of high voltage side.

14. The bi-directional DC-DC converting apparatus of claim 13, wherein the voltage error of low voltage side is a value obtained by subtracting the actual voltage of low voltage side from the reference voltage of low voltage side; and the voltage error of high voltage side is a value obtained by subtracting the actual voltage of high voltage side from the reference voltage of high voltage side;

the controlling unit operates the bi-directional DC-DC converter in a boost mode by determining the overall reference current $I_{ref}$ as $I_{ref}=\max(|I_{H\_ref}|, |I_{L\_ref}|)$ in the case in which the voltage error of high voltage side is the voltage error of low voltage side or more and operates the bi-directional DC-DC converter in a buck mode by determining the overall reference current $I_{ref}$ as $I_{ref}=-\max(|I_{H\_ref}|, |I_{L\_ref}|)$ in the case in which the voltage error of high voltage side is less than the voltage error of low voltage side, based on the voltage error of low voltage side, the voltage error of high voltage side, the reference current $I_{L\_ref}$ of low voltage side, and the reference current $I_{H\_ref}$ of high voltage side.

15. The bi-directional DC-DC converting apparatus of claim 14, wherein the power conversion mode control apparatus further includes a third subtractor generating a difference between the overall reference current output from the controlling unit and the current of low voltage side.

16. The bi-directional DC-DC converting apparatus of claim 15, wherein the bi-directional DC-DC converter includes:

a first gate driver outputting a first switching control signal according to the duty command;

an inverter for inverting the duty command;

a second gate driver outputting a second switching control signal according to an output of the inverter;

a capacitor of low voltage side connected to both ends of a low voltage battery;

an inductor having one end connected to an anode of the low voltage battery;

a first switch having one end connected to the other end of the inductor and the other end connected to a cathode of the low voltage battery and switched according to the first switching control signal;

a capacitor of high voltage side connected to both ends of a high voltage battery;

a second switch having one end connected to an anode of the high voltage battery and the other end connected to the other end of the inductor and switched according to the second switching control signal; and a current sensor sensing a current flowing through the inductor.

* * * * *